United States Patent [19]

Kawasumi et al.

[11] Patent Number: 5,741,354
[45] Date of Patent: Apr. 21, 1998

[54] AQUEOUS INK COMPOSITION FOR BALL-POINT PEN

[75] Inventors: Toshimitsu Kawasumi; Yoshiko Yamaoka, both of Osaka, Japan

[73] Assignee: Sakura Color Products Corporation, Osaka, Japan

[21] Appl. No.: 673,559

[22] Filed: Jul. 1, 1996

[30] Foreign Application Priority Data

Jul. 5, 1995 [JP] Japan ................................. 7-270750

[51] Int. Cl.$^6$ ................................. C09D 11/18
[52] U.S. Cl. ................................. 106/31.85; 106/31.89
[58] Field of Search ................................. 106/31.6, 31.85, 106/31.89, 503

[56] References Cited

U.S. PATENT DOCUMENTS

| | | | |
|---|---|---|---|
| 4,359,343 | 11/1982 | Silberg | 106/503 |
| 4,629,748 | 12/1986 | Miyajima et al. | 106/31.66 |
| 4,698,099 | 10/1987 | Nakamura et al. | 106/413 |
| 4,872,916 | 10/1989 | Latosky | 106/503 |
| 5,098,478 | 3/1992 | Krishnan et al. | 106/31.89 |
| 5,151,218 | 9/1992 | Haubennestel et al. | 106/499 |
| 5,215,579 | 6/1993 | Keemer et al. | 106/503 |
| 5,397,391 | 3/1995 | Stramel | 106/503 |
| 5,466,482 | 11/1995 | Johnson | 106/493 |
| 5,521,623 | 5/1996 | Loftin et al. | 106/31.89 |

FOREIGN PATENT DOCUMENTS 239569   8/1992   Japan .

*Primary Examiner*—Helene Klemanski
*Attorney, Agent, or Firm*—Armstrong, Westerman Hattori, McLeland & Naughton

[57] ABSTRACT

The present invention is an aqueous ink composition for ball-point pen comprising an aqueous ink mixture containing at least a pigment or colored polymer emulsion, a dispersant, a water-soluble organic solvent and water, and a compound of the general formula (1). Examples of such ink compositions include a sodium salt of polyoxyethylene alkyl ether phosphate monoester a sodium salt of polyoxyethylene alkyl ether phosphate diester, a triethanolamine salt of polyoxyethylene alkylphenyl ether phosphate monoester, triethanolamine salt of polyoxyethylene alkylphenyl ether phosphate diester. The aqueous ink composition provides a lubricity effect of rotating a ball smoothly when it is used for a ball-point pen. Therefore, the aqueous ink compositions are superior in lubricity and hence are free of clogging at the tip of ball-point pen even after prolonged use:

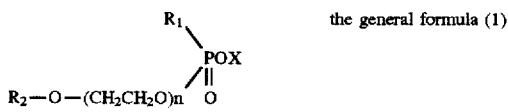

the general formula (1)

wherein R 1- is -OX or R 2 -O-(CH 2 CH 2 O)n-;

R 2 is C 8 to C 18 which is alkyl group, alkenyl group, or alkylphenyl group;

n=1 to 30;

X is an alkali metal, amine or alkanolamine.

8 Claims, No Drawings

AQUEOUS INK COMPOSITION FOR BALL-POINT PEN

BACKGROUND OF THE INVENTION

1. Field of the Invention

The present invention relates to aqueous ink compositions for ball-point pen and, more particularly, to such aqueous ink compositions which are superior in lubricity and hence are free of clogging at the tip of ball-point pen even after prolonged use.

2. Related Art

It has been a conventional practice to prepare an aqueous ink composition for ball-point pen by adding a water-soluble organic solvent of a polyvalent alcohol or a derivative thereof to an aqueous solution containing a water-soluble dye, water-dispersible pigment or colored polymer emulsion. Attempts have been made to enhance the lubricity of the aqueous ink composition by blending the ink composition with such lubricants as an alkali metal salt of an unsaturated fatty acid, or an alkali metal salt or amine salt of an anionic surface active agent having a carboxyl group.

With any of the foregoing conventional lubricants, however, the resultant ink has a difficulty in simultaneously satisfying requirements for lubricity and for other writing characteristics. For instance, an ink with satisfactory lubricity often exhibits extremely decreased surface tension, which may result in practical problems such that the ink is liable to blur on paper. Further, many ink compositions show unsatisfactory lubricity due to influences of selected pigment or resin, even if lubricants are added thereto.

It is, therefore, an object of the present invention to provide an aqueous ink composition for ball-point pen which is superior in lubricity and hence is free of clogging at the tip of ball-point pen even after prolonged use, assures long-term stability, and is less liable to blur on paper.

SUMMARY OF THE INVENTION

The present invention is an aqueous ink composition for ball-point pen comprising an aqueous ink mixture containing at least a pigment or colored polymer emulsion, a dispersant, a water-soluble organic solvent and water, and a compound of the general formula (1).

the general formula (1)

wherein R 1- is -OX or R 2 -O-(CH 2 CH 2 O)n-;

R 2 is C 8 to C 18 which is alkyl group, alkenyl group, or alkylphenyl group;

n=1 to 30;

X is an alkali metal, amine or alkanolamine.

An aqueous ink composition as defined in the general formula (1) is readily soluble in the aqueous ink composition, provides a lubricity effect of rotating a ball smoothly when it is used for a ball-point pen, assures long-term stability, and is less liable to blur on paper.

DESCRIPTION OF THE PREFERRED EMBODIMENTS

Preferred compounds of the formula (1) include those represented by the following specific formulae (1) to (11). Exemplary compounds thereof include a sodium salt of polyoxyethylene alkyl ether phosphate monoester, a sodium salt of polyoxyethylene alkyl ether phosphate diester, a triethanolamine salt of polyoxyethylene alkylphenyl ether phosphate monoester, triethanolamine salt of polyoxyethylene alkylphenyl ether phosphate diester.

The content of the compound to be used is not limited, which is preferably about 0.05% to about 10% by weight relative to the total amount of the aqueous ink composition. If the content thereof is less than 0.05% by weight, the resultant ink composition shows unsatisfactory lubricity. If the content thereof exceeds 10% by weight, the resultant ink composition causes blurring, or has increased viscosity, thereby deteriorating writing smoothness.

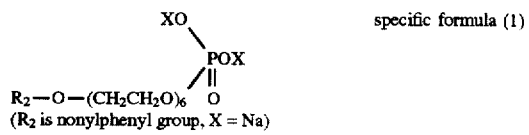

specific formula (1)

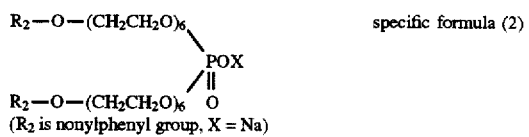

specific formula (2)

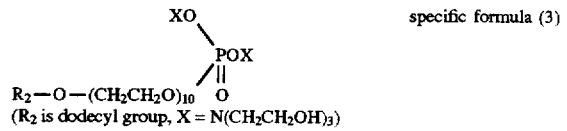

specific formula (3)

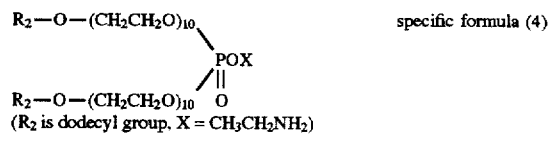

specific formula (4)

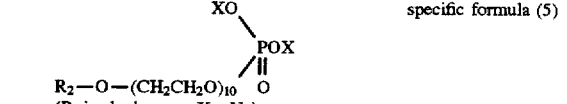

specific formula (5)

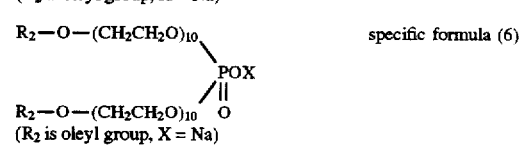

specific formula (6)

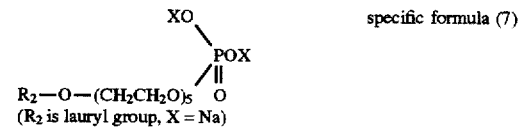

specific formula (7)

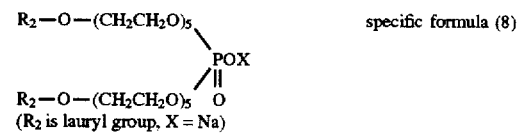

specific formula (8)

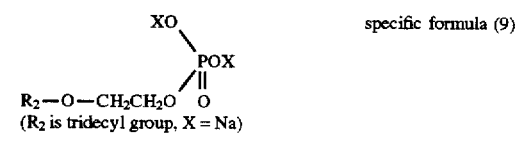

specific formula (9)

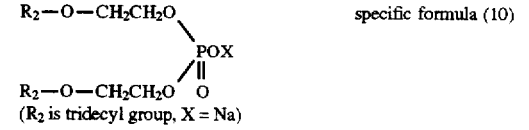

specific formula (10)

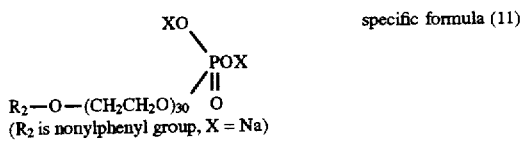

specific formula (11)

($R_2$ is nonylphenyl group, X = Na)

The pigment for use in the aqueous ink composition of the present invention may be any of various kinds of known pigments. Examples of specific pigments include organic pigments such as azo-type pigments, condensation polyazo-type pigments, phthalocyanine-type pigments, quinacridone-type pigments, anthraquinone-type pigments, dioxazine-type pigments, indigo-type pigments, thioindigo-type pigments, perinone, perylene-type pigments and melamine-type pigments; inorganic pigments such as tintanium oxides, iron oxides and carbon black; and colored polymer emulsions such as prepared by coloring an aqueous dispersion of fine polymer particles of an average particle diameter of 0.1 to 1 μm obtained by emulsion polymerization of one or more resins selected from styrene resins, acrylic resins and acrylonitrile resins with a basic dye or fluorescent basic dye and/or a fluorescent brightener. These may be used either alone or as mixtures.

The content of the pigment to be used is usually about 1% to about 30% by weight, preferably about 3% to about 15% by weight relative to the total amount of the ink composition.

If the content thereof is less than 1% by weight, the ink density on paper is undesirably reduced. On the other hand, if the content thereof is exceeds 30% by weight, the resultant ink composition has an increased viscosity and hence deteriorates writing smoothness.

The pigment dispersant comprises at least one selected from generally used water-soluble resins, surface active agents and the like. Although the water-soluble resins may be natural ones, semisynthetic ones or synthetic ones, water-soluble synthetic resins are the most preferable in terms of fungi- and rot-resistance and viscosity characteristics of ink for writing instruments. Examples of such synthetic resins include water-soluble acrylic resins, water-soluble maleic resins, water-soluble styrene resins, water-soluble styrene-acrylic resins, water-soluble styrene-maleic resins, polyvinyl pyrrolidone, polyvinyl alcohol and water-soluble urethane resins. The surface active agent for use in the present invention is any one selected from anionic surface active agents, cationic surface active agents, nonionic surface active agents and ampholytic surface active agents. The amount of such a dispersant to be used is about 0.05 parts to about 2 parts by weight relative to 1 part by weight of the pigment. If the amount is less than 0.05 parts by weight, the dispersion stability of the pigment is degraded. On the other hand, if the amount exceeds 2 parts by weight, the resultant ink composition has an increased viscosity and hence deteriorates writing smoothness.

Examples of water-soluble organic solvents include polyvalent alcohols such as ethylene glycol, diethylene glycol, propylene glycol and glycerin; glycol ethers such as propylene glycol monomethyl ether; and glycol ether esters such as propylene glycol monomethyl ether acetate. These may be used either alone or as mixtures. The content of such water-soluble organic solvent is preferably within the range of about 1% to about 40% by weight relative to the total amount of the ink composition. If the amount is less than 1% by weight, the resultant ink dries too fast at a pen tip. On the other hand, if the amount is exceeds 40% by weight, the resultant ink dries too slow on paper.

As required, the ink composition may contain appropriate pH adjustor, protective colloid formation agent, pseudo plasticity formation agent, rust-preventive agent, antiseptic agent, antifungal agent and the like. Examples of specific pH adjustors for use in the present invention include caustic soda, sodium carbonate, alkanolamine and ammonia. Usable as the protective colloid formation agent are alkaline salt, amine salt, or alkanolamine salt of bridged acrylic acid polymer. Examples of specific protective colloid formation agent for use include RHEOGIC 250H (available from NIHON JUNYAKU Co.,Ltd), JUNLON PW100 (available from NIHON JUNYAKU Co.,Ltd), CARBOPOL#934 (available from B.F.Goodrich Co.,Ltd), CARBOPOL #940 (available from B.F.Goodrich Co.,Ltd), PEMULEN (available from B.F.Goodrich Co.,Ltd), TR-1(available from B.F.Goodrich Co.,Ltd), TR-2 (available from B.F.Goodrich Co.,Ltd), and the like. Usable as the pseudo plasticity formation agent are natural polysaccharides and semisynthetic cellulosic polymers selected from generally-used water-soluble polymers. More specifically, exemplary natural polysaccharides include guar gum, locust bean gum, weran gum, rhamzan gum, xanthan gum, rheozan gum (available from SANSYO Co.,Ltd), and the like, which have polymeric structure such as obtained by polymerization of monosaccharides such as glucose, galactose, rhamnose, mannose and a glucuronic acid salt. The semisynthetic cellulosic polymers include methyl cellulose, ethyl cellulose and carboxymethyl cellulose which are rendered water-soluble by esterifying or etherifying the hydroxyl group of cellulose. Examples of specific corrosion-preventive agents usable in the present invention include benzotriazole, derivatives thereof and dicyclohexylammonium nitrate. Examples of specific antiseptic agents are potassium sorbate, sodium benzoate, pentachlorophenyl sodium, sodium dihydroacetate and 1,2-benzisothiazoline-3-on. Although the action of the compound represented by the general formula (1) according to the present invention has not been fully determined yet, it is supposed that the compound assists in forming a thin layer between a ball-receiving seat of metal tip and a ball, thereby enhancing the lubricity of the ink.

EXAMPLES

The present invention will be more fully described by way of examples thereof. In Examples 1 to 4 and Comparative Examples 1 and 2, ink compositions according to the present invention and reference ink compositions were applied to ball-point pens of the wick type. These ball-point pens each comprised an ink occluder formed of a bundle of fibers with its periphery covered with a film or resin and impregranted with a low-viscosity ink, a relay lead in communication with the ink occluder, and a pen tip made of German silver or stainless steel.

In Examples 5 to 13 and Comparative Examples 3 and 4, ink compositions according to the present invention and reference ink compositions were applied to ball-point pens of the ink free type with refill. These ball-point pens each comprised an ink tank having an ink container tube made of polypropylene or the like which was adapted to be directly charged with an aqueous ink (the same type as the oil ink type ball-point pen), the tail end of which was clogged with a back-flow preventive made of a material obtained by gelatinizing a base material such as polybutene with a gelatinizer, and a pen tip fitted around a ball-point pen tip made of a German silver or stainless steel at the top of the ink.

EXAMPLE 1

| | |
|---|---|
| Copper phthalocyanine green | 10.0 parts |
| Sodium salt of styrene-acrylic acid copolymer (dispersant) | 3.0 parts |
| Glycerin | 5.0 parts |
| Propylene glycol | 15.0 parts |
| Compound of general formula (1) specified by specific formula (1) | 2.0 parts |
| 1,2-benzisothiazoline-3-on (antiseptic agent) | 1.5 parts |
| Benzotriazole (corrosion-preventive agent) | 0.5 parts |
| Water | 63.0 parts |

Copper phthalocyanine green, sodium salt of styrene-acrylic acid copolymer and water were first mixed together for dispersion for one hour by means of a sand mill. The remaining ingredients were then added to the resultant dispersion, dissolved therein by stirring and adjusted the pH to 9 using caustic soda. A green ink was obtained after the resultant mixture was filtered.

EXAMPLE 2

| | |
|---|---|
| Copper phthalocyanine blue | 8.0 parts |
| Sodium salt of styrene-maleic acid copolymer (dispersant) | 2.0 parts |
| Glycerin | 10.0 parts |
| Propylene glycol | 15.0 parts |
| Compound of general formula (1) specified by specific formula (4) | 8.0 parts |
| Sodium benzoate (antiseptic agent) | 0.2 parts |
| Benzotriazole (corrosion-preventive agent) | 0.5 parts |
| Water | 56.3 parts |

Copper phthalocyanine blue, sodium salt of styrene-maleic acid copolymer and water were first mixed together for dispersion for one hour by means of a sand mill. The remaining ingredients were then added to the resultant dispersion, dissolved therein by stirring and adjusted the pH to 9 using caustic soda. A blue ink was obtained after the resultant mixture was filtered.

EXAMPLE 3

| | |
|---|---|
| Carbon black | 5.0 parts |
| Sodium salt of styrene-acrylic acid copolymer (dispersant) | 1.0 parts |
| Glycerin | 5.0 parts |
| Ethylene glycol | 15.0 parts |
| Compound of general formula (1) specified by specific formula (9) | 1.5 parts |
| Compound of general formula (1) specified by specific formula (10) | 1.5 parts |
| 1,2-benzisothiazoline-3-on (antiseptic agent) | 2.0 parts |
| Benzotriazole (corrosion-preventive agent) | 0.5 parts |
| Water | 68.5 parts |

Carbon black, sodium salt of styrene-acrylic acid copolymer and water were first mixed together for dispersion for one hour by means of a sand mill. The remaining ingredients were then added to the resultant dispersion, dissolved therein by stirring and adjusted the pH to 9 using caustic soda. A black ink was obtained after the resultant mixture was filtered.

EXAMPLE 4

| | |
|---|---|
| Quinacridone red | 8.0 parts |
| Sodium salt of styrene-maleic acid copolymer (dispersant) | 2.0 parts |
| Glycerin | 3.0 parts |
| Propylene glycol | 15.0 parts |
| Compound of general formula (1) specified by specific formula (8) | 0.5 parts |
| Sodium benzoate (antiseptic agent) | 1.0 parts |
| Benzotriazole (corrosion-preventive agent) | 0.5 parts |
| Water | 70.0 parts |

Quinacridone red, sodium salt of styrene-maleic acid copolymer and water were first mixed together for dispersion for one hour by means of a sand mill. The remaining ingredients were then added to the resultant dispersion, dissolved therein by stirring and adjusted the pH to 9 using caustic soda. A pink ink was obtained after the resultant mixture was filtered.

EXAMPLE 5

| | |
|---|---|
| Copper phthalocyanine blue | 5.0 parts |
| Sodium salt of styrene-acrylic acid copolymer (dispersant) | 1.0 parts |
| Ethylene glycol | 10.0 parts |
| Glycerin | 5.0 parts |
| Compound of general formula (1) specified by specific formula (7) | 1.0 parts |
| Compound of general formula (1) specified by specific formula (8) | 1.0 parts |
| CARBOPOL #940 3% aqueous solution (neutralized with equivalent NaOH) | 6.0 parts |
| 1,2-benzisothiazoline-3-on (antiseptic agent) | 0.5 parts |
| Benzotriazole (corrosion-preventive agent) | 0.5 parts |
| Xanthan gum (pseudo plasticity formation agent) | 0.3 parts |
| Water | 69.7 parts |

Xanthan gum was added little by little to 30 parts of water to avoid formation of undissolved lump of xanthan gum and completely dissolved therein by stirring. To the resultant solution were added copper phthalocyanine blue, sodium salt of styrene-acrylic acid copolymer and 39.7 parts of water, and the resultant mixture was stirred for dispersion for one hour by means of a sand mill. The remaining ingredients were then added to the resultant dispersion, dissolved therein by stirring for one hour and adjusted the pH to 9 using caustic soda. A blue ink was obtained after the resultant mixture was filtered.

EXAMPLE 6

| | |
|---|---|
| Copper phthalocyanine green | 4.0 parts |
| Sodium salt of styrene-acrylic acid copolymer (dispersant) | 1.5 parts |
| Propylene glycol | 10.0 parts |
| Glycerin | 5.0 parts |
| Compound of general formula (1) specified by specific formula (3) | 0.5 parts |
| JUNLON PW110 3% aqueous solution (neutralized with equivalent NaOH) | 3.0 parts |
| Sodium benzoate (antiseptic agent) | 1.0 parts |
| Benzotriazole (corrosion-preventive agent) | 0.5 parts |
| Xanthan gum (pseudo plasticity formation agent) | 0.3 parts |
| Water | 74.2 parts |

Xanthan gum was added little by little to 30 parts of water to avoid formation of undissolved lump of xanthan gum and completely dissolved therein by stirring. To the resultant solution were added copper phthalocyanine green, sodium salt of styrene-acrylic acid copolymer and 44.2 parts of water, and the resultant mixture was stirred for dispersion for one hour by means of a sand mill. The remaining ingredients were then added to the resultant dispersion, dissolved therein by stirring for one hour and adjusted the pH to 9 using caustic soda. A green ink was obtained after the resultant mixture was filtered.

EXAMPLE 7

| | |
|---|---|
| LUMICOL NKW-2105 (Dye: C.I. Basic Yellow 40) | 40.0 parts |
| Glycerin | 5.0 parts |
| Propylene glycol | 5.0 parts |
| Compound of general formula (1) specified by specific formula (3) | 6.0 parts |
| Sodium benzoate (antiseptic agent) | 1.0 parts |
| Benzotriazole (corrosion-preventive agent) | 0.5 parts |
| Weran gum (pseudo plasticity formation agent) | 0.3 parts |
| Water | 42.2 parts |

Weran gum was added little by little to 30 parts of water to avoid formation of undissolved lump of Weran gum and completely dissolved therein by stirring. The remaining ingredients were then added to the resultant solution, dissolved therein by stirring for one hour, and adjusted the pH to 7 using caustic soda. A fluorescent yellow ink was obtained after the resultant mixture was filtered.

EXAMPLE 8

| | |
|---|---|
| Carbon black | 4.0 parts |
| Sodium salt of styrene-acrylic acid copolymer (dispersant) | 1.0 parts |
| Propylene glycol | 10.0 parts |
| Glycerin | 5.0 parts |
| Compound of general formula (1) specified by specific formula (9) | 2.0 parts |
| Compound of general formula (1) specified by specific formula (10) | 2.0 parts |
| Sodium benzoate (antiseptic agent) | 1.0 parts |
| Benzotriazole (corrosion-preventive agent) | 0.5 parts |
| Xanthan gum (pseudo plasticity formation agent) | 0.3 parts |
| Water | 78.2 parts |

Xanthan gum was added little by little to 30 parts of water to avoid formation of undissolved lump of xanthan gum and completely dissolved therein by stirring. To the resultant solution were added carbon black, sodium salt of styrene-acrylic acid copolymer and 48.2 parts of water, and the resultant mixture was stirred for dispersion for one hour by means of a sand mill. The remaining ingredients were then added to the resultant dispersion, dissolved therein by stirring for one hour, and adjusted the pH to 9 using caustic soda. A black ink was obtained after the resultant mixture was filtered.

EXAMPLE 9

| | |
|---|---|
| Copper phthalocyanine green | 4.0 parts |
| Sodium salt of styrene-acrylic acid copolymer (dispersant) | 1.0 parts |
| Ethylene glycol | 15.0 parts |
| Glycerin | 5.0 parts |
| Compound of general formula (1) specified by specific formula (5) | 1.0 parts |
| Compound of general formula (1) specified by specific formula (6) | 1.0 parts |
| CARBOPOL #940 3% aqueous solution (neutralized with equivalent NaOH) | 6.0 parts |
| 1,2-benzisothiazoline-3-on (antiseptic agent) | 0.5 parts |
| Benzotriazole (corrosion-preventive agent) | 0.5 parts |
| Xanthan gum (pseudo plasticity formation agent) | 0.3 parts |
| Water | 62.7 parts |

Xanthan gum was added little by little to 30 parts of water to avoid formation of undissolved lump of xanthan gum and completely dissolved therein by stirring. To the resultant solution were added copper phthalocyanine green, sodium salt of styrene-acrylic acid copolymer and 32.7 parts of water, and the resultant mixture was stirred for dispersion for one hour by means of a sand mill. The remaining ingredients were then added to the resultant dispersion, dissolved therein by stirring for one hour, and adjusted the pH to 9 using caustic soda. A green ink was obtained after the resultant mixture was filtered.

EXAMPLE 10

| | |
|---|---|
| Dioxajin violet | 4.0 parts |
| Sodium salt of styrene-acrylic acid copolymer (dispersant) | 1.5 parts |
| Propylene glycol | 10.0 parts |
| Glycerin | 5.0 parts |
| Compound of general formula (1) specified by specific formula (2) | 0.1 parts |
| Compound of general formula (1) specified by specific formula (10) | 0.1 parts |
| JUNLON PW110 3% aqueous solution (neutralized with equivalent NaOH) | 3.0 parts |
| Sodium benzoate (antiseptic agent) | 1.0 parts |
| Benzotriazole (corrosion-preventive agent) | 0.5 parts |
| Xanthan gum (pseudo plasticity formation agent) | 0.3 parts |
| Water | 74.5 parts |

Xanthan gum was added little by little to 30 parts of water to avoid formation of undissolved lump of xanthan gum and completely dissolved therein by stirring. To the resultant solution were added Dioxajin violet, sodium salt of styrene-acrylic acid copolymer and 44.5 parts of water, and the resultant mixture was stirred for dispersion for one hour by means of a sand mill. The remaining ingredients were then added to the resultant dispersion, dissolved therein by stirring for one hour, and adjusted the pH to 9 using caustic soda. A violet ink was obtained after the resultant mixture was filtered.

EXAMPLE 11

| | |
|---|---|
| LUMICOL NKW-2117 (Dye: C.I. Basic Violet11 Red 1:1) | 40.0 parts |
| Glycerin | 5.0 parts |
| Propylene glycol | 10.0 parts |
| Compound of general formula (1) specified by specific formula (6) | 9.0 parts |
| CARBOPOL #940 3% aqueous solution (neutralized with equivalent NaOH) | 6.0 parts |
| Sodium benzoate (antiseptic agent) | 1.0 parts |
| Benzotriazole (corrosion-preventive agent) | 0.5 parts |
| Xanthan gum (pseudo plasticity formation agent) | 0.3 parts |
| Water | 31.2 parts |

Xanthan gum was added little by little to 30 parts of water to avoid formation of undissolved lump of xanthan gum and completely dissolved therein by stirring. The remaining ingredients were then added to the resultant solution, dissolved therein by stirring for one hour, and adjusted the pH to 7 using caustic soda. A fluorescent pink ink was obtained after the resultant mixture was filtered.

EXAMPLE 12

| | |
|---|---|
| Carbon black | 6.0 parts |
| Sodium salt of styrene-acrylic acid copolymer (dispersant) | 1.0 parts |
| Ethylene glycol | 10.0 parts |
| Glycerin | 5.0 parts |

| Compound of general formula (1) specified by specific formula (5) | 2.1 parts |
|---|---|
| Compound of general formula (1) specified by specific formula (6) | 2.1 parts |
| CARBOPOL #940 3% aqueous solution (neutralized with equivalent NaOH) | 6.0 parts |
| Sodium benzoate (antiseptic agent) | 1.0 parts |
| Benzotriazole (corrosion-preventive agent) | 0.5 parts |
| Xanthan gum (pseudo plasticity formation agent) | 0.3 parts |
| Water | 70.2 parts |

Xanthan gum was added little by little to 30 parts of water to avoid formation of undissolved lump of xanthan gum and completely dissolved therein by stirring. To the resultant solution were added carbon black, sodium salt of styrene-acrylic acid copolymer and 40.2 parts of water, and the resultant mixture was stirred for dispersion for one hour by means of a sand mill. The remaining ingredients were then added to the resultant dispersion, dissolved therein by stirring for one hour and adjusted the pH to 9 using caustic soda. A black ink was obtained after the resultant mixture was filtered.

EXAMPLE 13

| Carbon black | 4.0 parts |
|---|---|
| Sodium salt of styrene-acrylic acid copolymer (dispersant) | 1.0 parts |
| Propylene glycol | 10.0 parts |
| Glycerin | 5.0 parts |
| Compound of general formula (1) specified by specific formula (11) | 5.0 parts |
| Soda benzoate (antiseptic agent) | 1.0 parts |
| Benzotriazole (corrosion-preventive agent) | 0.5 parts |
| Xanthan gum (pseudo plasticity formation agent) | 0.3 parts |
| Water | 73.2 parts |

Xanthan gum was added little by little to 30 parts of water to avoid formation of undissolved lump of xanthan gum and completely dissolved therein by stirring. To the resultant solution were added carbon black, sodium salt of styrene-acrylic acid copolymer and 43.2 parts of water, and the resultant mixture was stirred for dispersion for one hour by means of a sand mill. The remaining ingredients were then added to the resultant dispersion, dissolved therein by stirring for one hour, and adjusted the pH to 9 using caustic soda. A black ink was obtained after the resultant mixture was filtered.

Comparative Example 1

A green ink was prepared substantially the same manner as described in Example 1 except that the compound of general formula (1) specified by specific formula (1) was replaced with the same amount of water.

Comparative Example 2

A green ink was prepared substantially the same manner as described in Example 3 except that the compound of general formula (1) specified by specific formula (1) was replaced with the same amount of oleic acid triethanolamine salt.

Comparative Example 3

A green ink was prepared substantially in the same manner as described in Example 5 except that the compound of general formula (1) specified by specific formulae (7) and (8) was replaced with the same amount of water.

Comparative Example 4

A green ink was prepared substantially in the same manner as described in Example 5 except that the compound of general formula (1) specified by specific formulae (7) and (8) was replaced with the same amount of oleic acid triethanolamine salt.

Writing characteristic tests were carried out using writing instruments respectively charged with the aqueous ink compositions prepared in Examples 1 to 13 and Comparative Examples 1 to 4.

Writing instruments were manufactured as an experience, which were charged with the aqueous ink compositions prepared in Examples 1 to 4 and Comparative Examples 1 and 2 in aqueous ink ball-point pens of the wick type. The aqueous ink compositions prepared in Examples 1 to 4 and Comparative Examples 1 and 2 were each impregnated in an ink occluder, which was housed in an aqueous ink ball-point pen comprising a relay lead, an ultra-hard ball having a diameter of 0.6 mm and a writing tip made of German silver. And the aqueous ink compositions prepared in Examples 1 to 4 and Comparative Examples 1 and 2 were each impregnated in an ink occluder, which was housed in an aqueous ink ball-point pen comprising a relay lead, an ultra-hard ball having a diameter having a diameter of 0.5 mm and a writing tip made of stainless steel.

The aqueous ink compositions prepared in Examples 5 to 13 and Comparative Examples 3 and 4 (high-viscosity inks) were each filled in a ink container tube made of polypropylene, of the same type as that of an oil ink ball-point pen, which was clogged with back-flow preventing grease at the tail end thereof to be formed into an ink tank. Then, thus prepared refills respectively containing these aqueous ink compositions were centrifuged for deaeration. Two kinds of writing instruments are used as these ball-point pens. One was fitted with a writing tip made of German silver at the top thereof, and the other was fitted with a writing tip made of stainless steel at the top thereof.

First, using a spiral-type writing tester, a line of 500 m was drawn on a JIS P3201 paper sheet A with each of the ball-point pens thus prepared, under the following writing conditions: writing angle=65 degrees, load=100 g and writing speed=7 cm/sec. Thereafter, the writing touch of each of the ball-point pens was examined by handwriting. Further, the writing tip in each of the ball-point pens was cleaned and then measured for an amount of ball sinkage by means of a tool microscope. Another sample group of the ball-point pens were allowed to stand for one month within a thermostatic chamber at a temperature of 50° C. with the writing tips thereof being oriented downward.

The test results are shown in Table 1.

TABLE 1

| Ink | Writing touch | Ball sinkage (μm) | | Writing after 1-month storage (50° C.) |
|---|---|---|---|---|
| | | German | Stainless | |
| Ex. 1 | Smooth | 7.1 | 5.6 | good |
| Ex. 2 | Smooth | 3.8 | 2.1 | good |
| Ex. 3 | Smooth | 6.5 | 4.9 | good |
| Ex. 4 | Smooth | 9.7 | 8.3 | good |
| Ex. 5 | Smooth | 7.3 | 5.0 | good |
| Ex. 6 | Smooth | 9.6 | 8.1 | good |
| Ex. 7 | Smooth | 5.3 | 3.2 | good |
| Ex. 8 | Smooth | 6.6 | 4.5 | good |
| Ex. 9 | Smooth | 7.4 | 5.7 | good |

TABLE 1-continued

| Ink | Writing touch | Ball sinkage (μm) German | Ball sinkage (μm) Stainless | Writing after 1-month storage (50° C.) |
|---|---|---|---|---|
| Ex. 10 | Smooth | 11.2 | 9.6 | good |
| Ex. 11 | Smooth | 4.2 | 3.0 | good |
| Ex. 12 | Smooth | 6.5 | 4.9 | good |
| Ex. 13 | Smooth | 6.7 | 5.1 | good |
| Comp. Ex. 1 | Line with breaks | 34.1 | 29.5 | good |
| Comp. Ex. 2 | Smooth | 18.6 | 16.2 | pigment density increased |
| Comp. Ex. 3 | Line with breaks | 32.9 | 27.2 | good |
| Comp. Ex. 4 | Smooth | 16.6 | 14.8 | pigment density increased |

As has been described, the aqueous ink composition for ball-point pen of the present invention is excellent in lubricity, wear resistance of ball seat, writing touch and long-term stability.

What is claimed:

1. An aqueous ink composition for ball-point pen comprising an aqueous ink mixture containing at least a pigment or colored polymer emulsion, a dispersant, a water-soluble organic solvent and water, and a compound of the general formula (1):

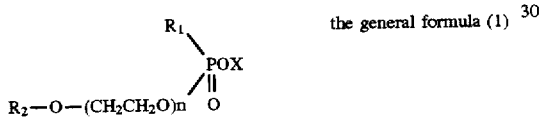

the general formula (1)

wherein R 1 - is -OX or R 2 -O-(CH 2 CH 2 O)n-;

R 2 is C 8 to C 18 which is alkyl group, alkenyl group, or alkylphenyl group;

n=1 to 30;

X is an alkali metal, amine or alkanolamine.

2. An aqueous ink composition as defined in claim 1, wherein said compound (1) includes one or more compounds selected from the group consisting of the specific formulae (1) to (11):

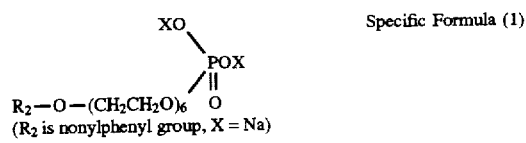

Specific Formula (1)
($R_2$ is nonylphenyl group, X = Na)

Specific formula (2)
($R_2$ is nonylphenyl group, X = Na)

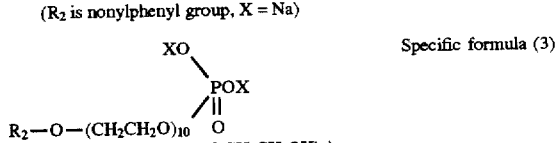

Specific formula (3)
($R_2$ is dodecyl froup, X = N(CH$_2$CH$_2$OH)$_3$)

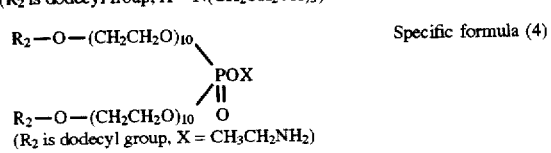

Specific formula (4)
($R_2$ is dodecyl group, X = CH$_3$CH$_2$NH$_2$)

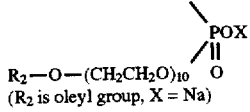

Specific formula (5)
($R_2$ is oleyl group, X = Na)

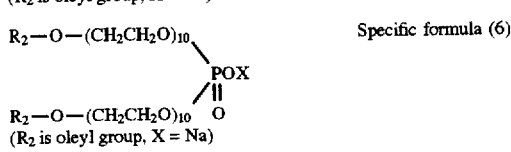

Specific formula (6)
($R_2$ is oleyl group, X = Na)

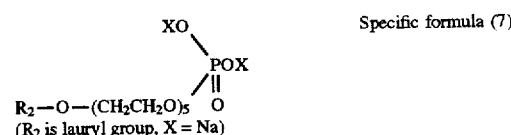

Specific formula (7)
($R_2$ is lauryl group, X = Na)

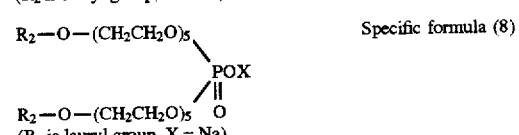

Specific formula (8)
($R_2$ is lauryl group, X = Na)

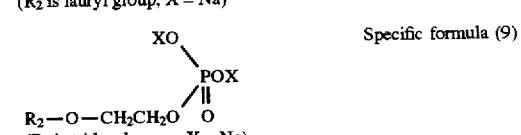

Specific formula (9)
($R_2$ is tridecyl group, X = Na)

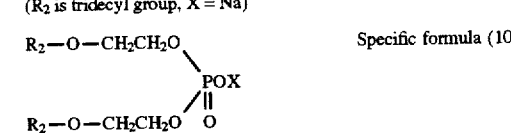

Specific formula (10)
($R_2$ is tridecyl group, X = Na)

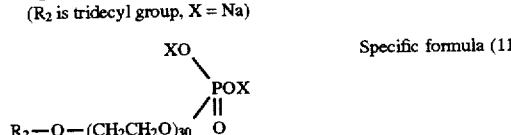

Specific formula (11)
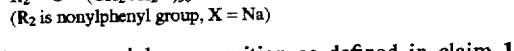
($R_2$ is nonylphenyl group, X = Na)

3. An aqueous ink composition as defined in claim 1, wherein said compound of the general formula (1) is contained in amount of about 0.05% to about 10% by weight relative to the total amount of the ink composition.

4. An aqueous ink composition as defined in claim 1, further comprising a pseudo plasticity formation agent.

5. An aqueous ink composition as defined in claim 1, further comprising a protective colloid formation agent.

6. An aqueous ink composition as defined in claim 5, wherein said protective colloid formation agent is alkaline salt, amine salt or alkanolamine salt of bridged acrylic acid polymer.

7. An aqueous ink composition as defined in claim 4, wherein said pseudo plasticity formation agent is a xanthan gum.

8. A writing instrument comprising:
an ink container tube is charged with an aqueous ink composition as defined in claim 1;
a back-flow preventive member fitted into a tail end of the ink container tube;
a pen tip attached at the leading end of the ink container tube;
a writing tip attached to an end of said pen tip; and an ink chamber disposed within said ink container tube.

* * * * *

REEXAMINATION CERTIFICATE (4191st)

United States Patent
Kawasumi et al.

[11] B1 5,741,354
[45] Certificate Issued Oct. 31, 2000

[54] AQUEOUS INK COMPOSITION FOR BALL-POINT PEN

[75] Inventors: Toshimitsu Kawasumi; Yoshiko Yamaoka, both of Osaka, Japan

[73] Assignee: Sakura Color Products Coproation, Osaka, Japan

Reexamination Request:
No. 90/005,261, Feb. 16, 1999

Reexamination Certificate for:
Patent No.: 5,741,354
Issued: Apr. 21, 1998
Appl. No.: 08/673,559
Filed: Jul. 1, 1996

[30] Foreign Application Priority Data

Jul. 5, 1995 [JP] Japan ................................. 7-270750

[51] Int. Cl.$^7$ ................................................. C09D 11/18
[52] U.S. Cl. ..................................... 106/31.85; 106/31.89
[58] Field of Search ............................. 106/31.85, 31.89

[56] References Cited

FOREIGN PATENT DOCUMENTS

| 0587391 | 3/1994 | European Pat. Off. . |
|---|---|---|
| 38226 | 8/1986 | Japan . |
| 272674 | 10/1989 | Japan . |
| 76665 | 3/1995 | Japan . |

OTHER PUBLICATIONS

Material safety data sheet on PLYSURF A–219B, Sep. 1985.
Material safety data sheet on PLYSURF M–208B, Sep. 1985.
Material safety data sheet on PLYSURF A–212E, Sep. 1985.
Material safety data sheet on PLYSURF A–212C, Sep. 1985.
Material safety data sheet on PLYSURF M–208F, Sep. 1985.

*Primary Examiner*—Helene Klemanski

[57] ABSTRACT

The present invention is an aqueous ink composition for ball-point pen comprising an aqueous ink mixture containing at least a pigment or colored polymer emulsion, a dispersant, a water-soluble organic solvent and water, and a compound of the general formula (1). Examples of such ink compositions include a sodium salt of polyoxyethylene alkyl ether phosphate monoester a sodium salt of polyoxyethylene alkyl ether phosphate diester, a triethanolamine salt of polyoxyethylene alkylphenyl ether phosphate monoester, triethanolamine salt of polyoxyethylene alkylphenyl ether phosphate diester. The aqueous ink composition provides a lubricity effect of rotating a ball smoothly when it is used for a ball-point pen. Therefore, the aqueous ink compositions are superior in lubricity and hence are free of clogging at the tip of ball-point pen even after prolonged use:

the general formula (1)

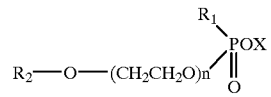

wherein $R_1$ is -OX or $R_2$-O-$(CH_2CH_2O)_n$-;

$R_2$ is $C_8$ to $C_{18}$ which is alkyl group, alkenyl group, or alkylphenyl group;

n=1 to 30;

X is an alkali metal, amine or alkanolamine.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

Claims 3–8, dependent on an amended claim, are determined to be patentable.

1. [An] *A ball-point pen* aqueous ink composition [for ball-point pen] comprising an aqueous ink mixture containing at least a pigment or colored polymer emulsion, a dispersant, a water-soluble organic solvent and water, and a compound of the general formula (1):

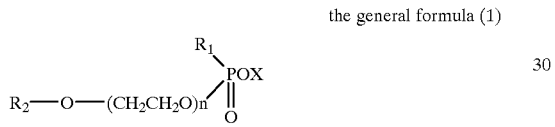

the general formula (1)

wherein $R_1$ is $-OX$ or $R_2-O-(CH_2CH_2O)_n-$;
$R_2$ is C 8 to C 18 which is alkyl group, alkenyl group, or alkylphenyl group;
n=1 to 30;
X is an alkali metal[, amine or alkanolamine].

2. An aqueous ink composition as defined in claim 1, wherein said compound (1) includes one or more compounds selected from the group consisting of the specific formulae (1) to (11):

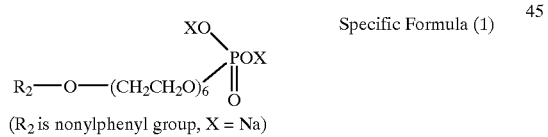

Specific Formula (1)

($R_2$ is nonylphenyl group, X = Na)

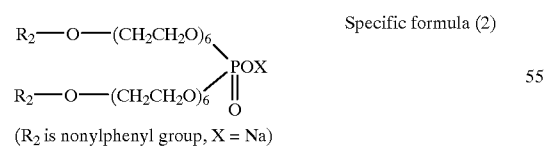

Specific formula (2)

($R_2$ is nonylphenyl group, X = Na)

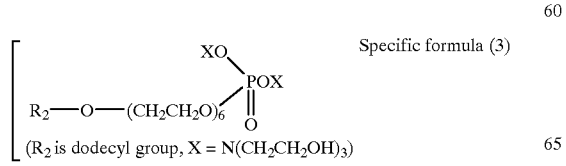

Specific formula (3)

($R_2$ is dodecyl group, X = N(CH_2CH_2OH)_3)

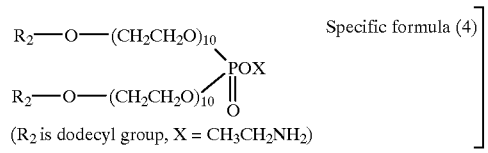

Specific formula (4)

($R_2$ is dodecyl group, X = CH_3CH_2NH_2)

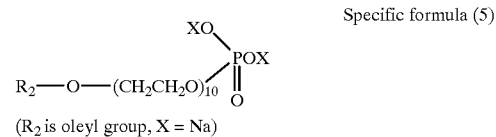

Specific formula (5)

($R_2$ is oleyl group, X = Na)

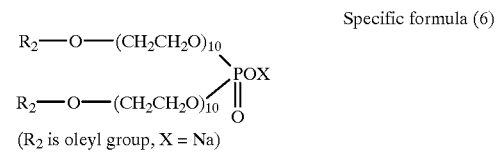

Specific formula (6)

($R_2$ is oleyl group, X = Na)

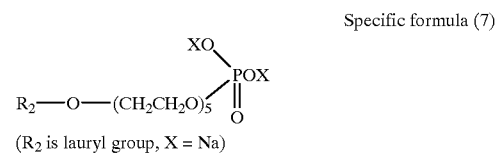

Specific formula (7)

($R_2$ is lauryl group, X = Na)

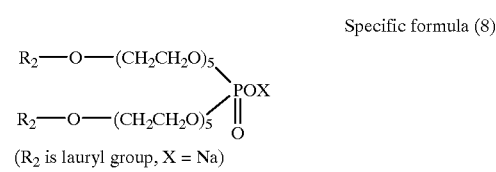

Specific formula (8)

($R_2$ is lauryl group, X = Na)

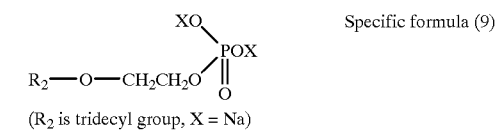

Specific formula (9)

($R_2$ is tridecyl group, X = Na)

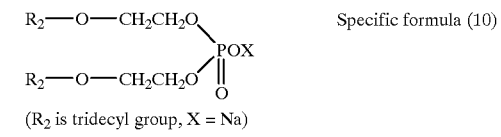

Specific formula (10)

($R_2$ is tridecyl group, X = Na)

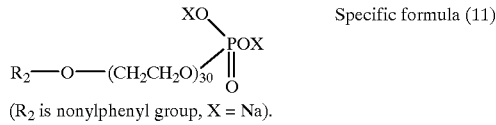

Specific formula (11)

($R_2$ is nonylphenyl group, X = Na).

* * * * *